United States Patent

McBride et al.

[15] 3,701,975

[45] Oct. 31, 1972

[54] APPARATUS FOR INSTRUCTING DATA SYSTEM MACHINE OPERATORS IN THE ENCODING OF SOURCE DOCUMENTS

[72] Inventors: Frank J. McBride, 104 West Lake Drive; Carl Robert Lindsley, 2332 Mayfair Drive, both of Salina, Kans. 67401

[22] Filed: Dec. 23, 1970

[21] Appl. No.: 100,956

[52] U.S. Cl. ....................340/172.5, 35/6
[51] Int. Cl. ....................G09b 13/04
[58] Field of Search ....340/172.5; 35/5, 6; 235/61.11

[56] References Cited

UNITED STATES PATENTS

| | | |
|---|---|---|
| 3,162,959 | 12/1964 | Woolman ....................35/6 X |
| 3,281,959 | 11/1966 | Kobler et al. ....................35/6 |
| 3,136,073 | 6/1964 | Steury ....................35/6 |
| 3,208,160 | 9/1965 | Smith ....................35/5 |
| 3,303,331 | 2/1967 | Biegel et al. ..........235/61.11 E |
| 3,309,796 | 3/1967 | Whitlock ....................35/6 X |
| 3,533,078 | 10/1970 | Perkins et al. ..........340/172.5 |
| 3,541,526 | 11/1970 | Levy et al. ..........340/172.5 |
| 3,573,749 | 4/1971 | Smith et al. ..........340/172.5 |
| 3,596,254 | 7/1971 | Highleyman et al. ....340/172.5 |
| 3,596,256 | 7/1971 | Alpert et al. ..........340/172.5 |

*Primary Examiner*—Paul J. Henon
*Assistant Examiner*—Melvin B. Chapnick
*Attorney*—D. A. N. Chase

[57] ABSTRACT

Apparatus for instructing the operator of a data system machine, such as a multiple row keyboard adding machine of an add-punch system. Instructions for each line of the source document are on a suitable optical medium, such as a rotary drum or a film strip. A line of instructions for a given line to be completed on the document is displayed in view of the operator, and the display is automatically advanced to the next succeeding line of instructions when the line on the document is encoded and the document likewise advanced to the next line. The lines of instructions on the medium are grouped into programs corresponding to the various types of source documents to be accommodated, each program being selectable by the operator. After completion of encoding at the end of a selected program, the display automatically returns to the first line of instruction of the selected program in readiness for the next document of that type to be prepared.

6 Claims, 5 Drawing Figures

INVENTORS.
Frank J. Mc Bride and
Carl Robert Lindsley
BY
D. A. N. Chase
ATTORNEY INVENTORS.
Frank J. McBride and
Carl Robert Lindsley
BY D. A. N. Chase
ATTORNEY

APPARATUS FOR INSTRUCTING DATA SYSTEM MACHINE OPERATORS IN THE ENCODING OF SOURCE DOCUMENTS

This invention relates to apparatus for instructing data system machine operators in the encoding of source documents and/or storage media utilized in electronic data processing (EDP) equipment.

In most businesses the recording of transactions is a necessary incident to operation, and may include the recording of such information as account numbers, the type of transaction, customer names and addresses, dates, quantities, unit prices, totals, weights, measures, rates, and other essential variables. With the advent of electronic data processing for business use, it has become essential that all pertinent data for the system be properly encoded on a source document and recorded on punched tape, cards or other storage media for transmission of information to the computer. However, oftentimes as a practical matter this is handled by relatively untrained personnel, which maximizes the opportunity for human error at the critical information input to the system.

It is, therefore, the primary object of the present invention to provide instructional apparatus for use in conjunction with data system machines, which is capable of instructing personnel in the encoding of source material even though such personnel may have had little, if any, prior familiarization with EDP equipment.

As a corollary to the foregoing object, it is a specific aim of this invention to provide apparatus as aforesaid for instructing the operators of multiple row keyboard machines to assure that information of the proper character is encoded by the keys of the various rows on the appropriate lines of the source material.

Furthermore, another important object of this invention is to provide instructional apparatus for use with data system encoding machines, wherein instructions for the operator are on an optical medium which is automatically incrementally advanced as necessary as the input data is encoded in a prescribed sequence.

Still another important object of this invention is to provide apparatus as aforesaid in which the instructional information is incrementally optically displayed and is grouped into programs corresponding to various types of source documents to be accommodated, and wherein any of the programs may be selected by the operator for exclusive, repeated use, in which case the selected program automatically repeats for the encoding of successive documents of that type.

Yet another important object of the invention is to provide apparatus as aforesaid in which the instructional information is on an optical medium which is incrementally advanced to display successive sets of instructions, and wherein the position of the medium is controlled by a comparator which receives input information identifying the set of instructions that should be displayed and input information identifying the set of instructions being displayed.

Figure 1:
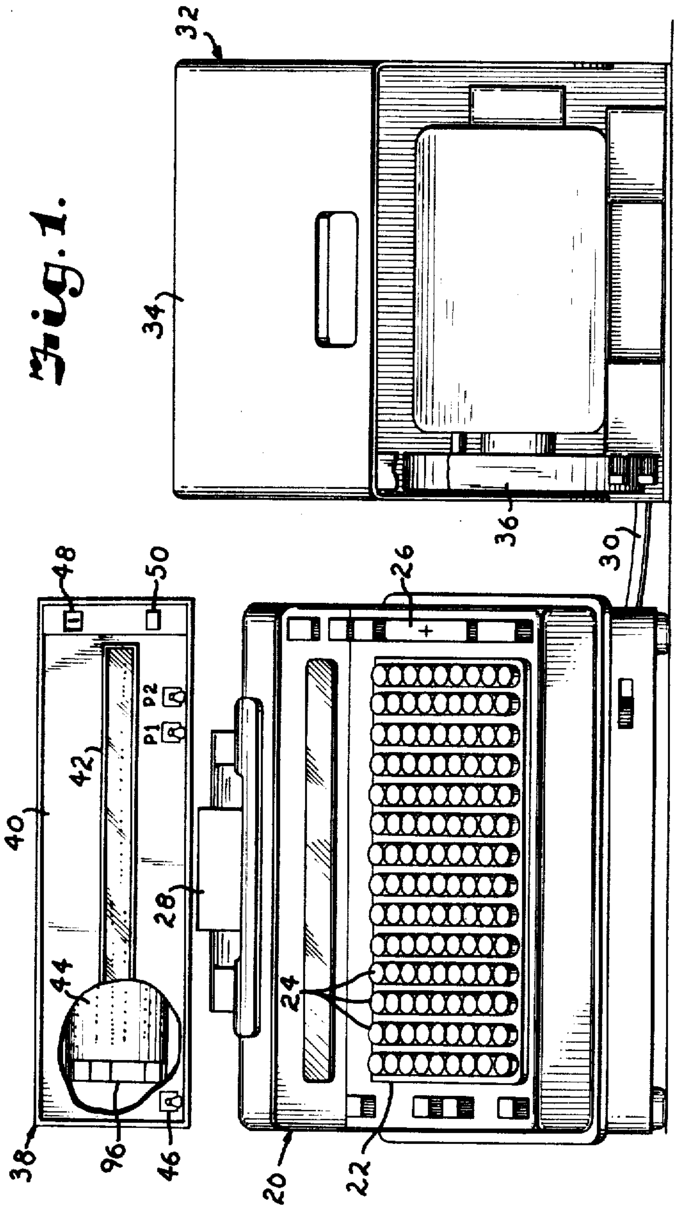
FIG. 1 is a front elevational view of the adding machine and punched tape recorder of an add-punch system, showing the display unit of the present invention mounted above the adding machine in view of the operator.

Referring initially to FIG. 1, an adding machine 20 is shown provided with a keyboard 22 having fourteen rows of keys 24 which may be selectively depressed by the operator in the usual fashion. A "plus" motor bar 26, when depressed, causes the numeric information indexed on the keyboard to be printed on a paper tape 28 which, in the present invention, is in the form of a printed source document to be described hereinafter. An electrical cable 30 connects the machine 20 to a punch tape recorder 32 shown with its cover 34 raised to reveal storage media 36 in the form of a punched paper tape. Accordingly, the machine 20 and the recorder 32 comprise the basic equipment components of an add-punch system in which operation of the motor bar 26 causes the numeric information indexed on the keyboard 22 to be recorded in code on the paper tape 36 as well as printed on the tape 28.

A display unit 38 of the present invention is disposed just above the adding machine 20 in view of the operator and comprises a rectangular housing provided with a front panel 40 having an elongated, horizontal window 42 therein through which instructional information on a rotatable drum 44 may be seen. The window 42 is as long as the width of the keyboard 22 so that the instructions on the drum 44 (discussed hereinafter with reference to FIG. 5) are vertically aligned with corresponding rows of keys 24. An on-off switch 46 is accessible on the front panel 40, which also mounts a pair of program selector switches identified P1 and P2 respectively. A small, square window 48 enables the operator to view the digital information on the readout cylinder of a digital setting switch to be described hereinafter, such switch being provided with a manual advance button 50.

Figure 2:
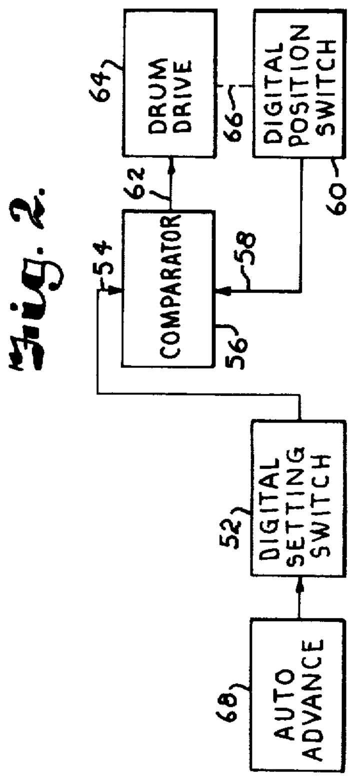
FIG. 2 is a block diagram showing the operative interrelationship of the electrical and mechanical components of the invention.

In FIG. 2, the digital setting switch is illustrated in block diagram form at 52 and delivers a signal in digital form to one input 54 of a digital comparator 56. The signal at the input 54 identifies the instructional line on the drum 44 that should be visible through the window 42. The second input 58 of the comparator 56 receives a digital signal from a digital position switch 60 that identifies the line on the drum 44 that is actually being displayed to the operator through the window 42. The output 62 of the comparator 56 delivers a signal to the drum drive 64 when unlike digital information is present at the inputs 54 and 58. A mechanical linkage 66 interconnects the position switch 60 and the drum drive 64 so that the position switch 60 monitors the rotative position of the drum 44 as will be subsequently discussed. Provision is made for automatic advance of the digital setting switch 52 as is indicated by the functional block 68.

Figures 3, 4:
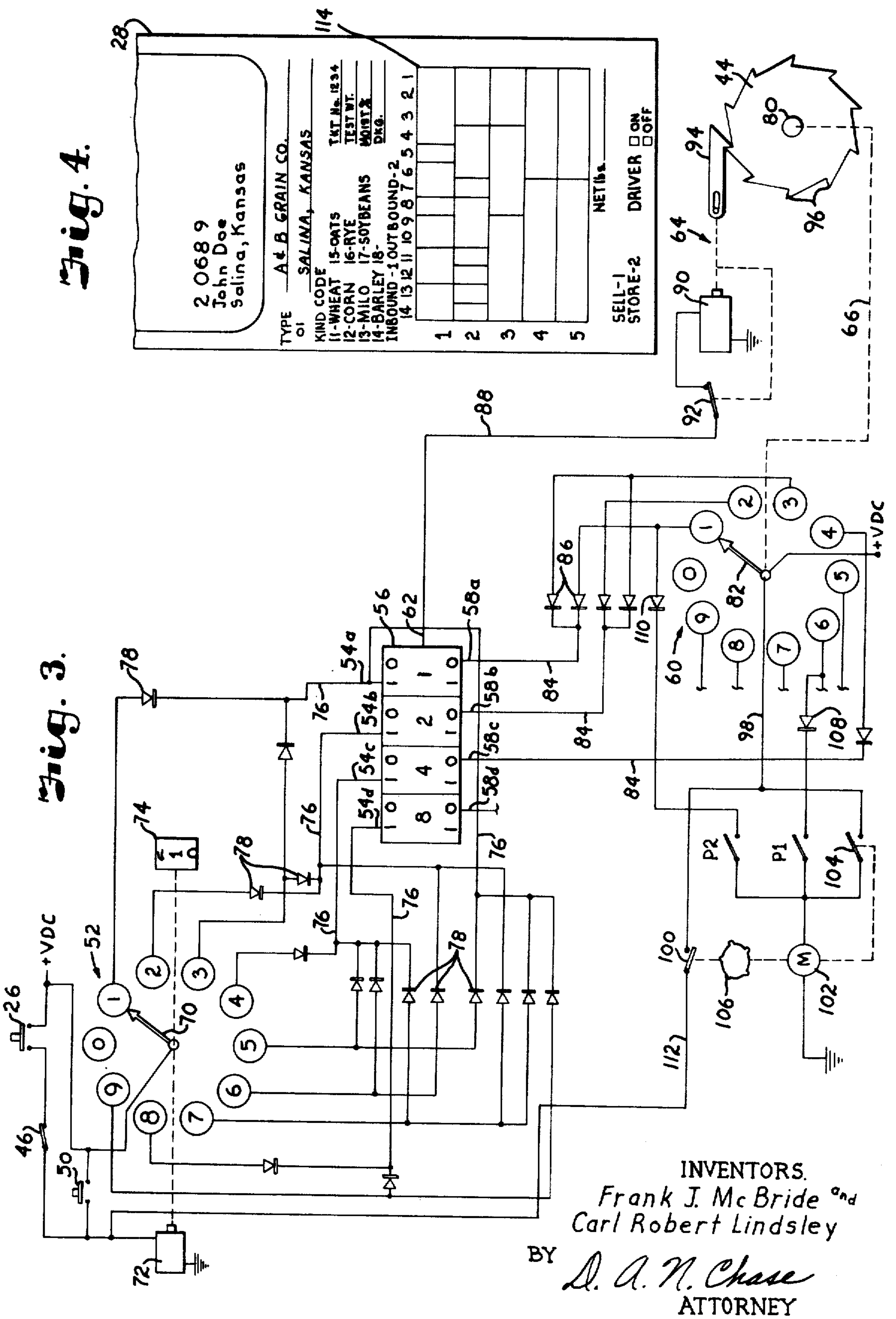
FIG. 3 is a schematic diagram illustrating the electrical control circuitry of the invention.
FIG. 4 illustrates a source document in the form of a blank scale ticket.

With reference to FIG. 3, it may be seen that the digital setting switch 52 comprises a stepper relay arrangement having a rotary switch element 70, 10 associated contacts identified 0 through 9, an advance coil 72 mechanically coupled with the switch element 70, and a digital readout cylinder 74 rotatable with the switch element 70 and provided with the figures 0 through 9 visible through the window 48. The motor bar 26, when depressed, closes a switch shown in FIG. 3 and also designated by the reference numeral 26, such switch and the on-off switch 46 being connected in series between a source of direct potential (plus VDC) and the advance coil 72. The switch element 70 is also connected to the positive power terminal, and the push button switch 50, normally open, is connected between the positive power terminal and the advance coil 72 in shunt relationship to the switches 26 and 46. The negative side of the power source is represented by the ground symbol.

The various contacts 0 through 9 of the digital setting switch 52 are connected to the input 54 of the comparator 56, such input comprising four binary input terminals **54*a*, 54*b*, 54*c* and 54*d*. The comparator 56 illustrated in FIG. 3 is a TTL (transistor-transistor logic) integrated logic module, the binary input terminals 54*a*–54 corresponding to the binary code 1–2–4–8 as illustrated by the legend. Accordingly, the decimal number represented by the contacts 0 through 9 of the digital setting switch 52 is converted into binary coded form for presentation to the input terminals 54*a*–54*d*. This is accomplished by the various interconnecting leads 76 and associated isolation diodes 78. For example, it may be noted that the 5 contact of the digital setting switch 52 is connected by two leads 76 to the terminals 54a and 54c representing the numbers 1 and 4** respectively, which total five.

The drum 44 is diagrammatically illustrated in FIG. 3 and is provided with an axle 80 mechanically coupled by the linkage 66 to a rotatable switch element 82 engageable with ten contacts identified 0 through 9. The switch element 82 and its associated contacts comprise the digital position switch 60 which monitors the position of the drum 44. The input 58 of the comparator 56 has four binary terminals **58*a*, 58*b*, 58*c* and 58*d* and receives the digital signal from the position switch 60 in binary coded form. Only a portion of the interconnecting leads 84 and associated isolation diodes 86 between the position switch contacts and the binary input terminals are shown for purposes of clarity, it being evident that each of the contacts of the position switch 60** is connected to the appropriate binary terminal or terminals in accordance with the code.

The output 62 of the comparator 56 is connected by a lead 88 to a solenoid 90 through interrupter contacts 92 mechanically coupled with the armature of the solenoid 90. Such armature is also mechanically coupled to the pawl 94 of a ratchet mechanism having a ratchet wheel presented by teeth 96 on the circumferential periphery of the drum 44.

The switch element 82 of the position switch 60 is connected to the positive power terminal, and a lead 98 extends from the switch element 82 to supply positive voltage to a cam switch 100 and a timing motor 102. The output shaft of the motor 102 operates a normally open carrier switch 104 in series with the lead 98, and is provided with a five-lobe cam 106 which actuates the switch 100. A diode 108 and the program switch P1 are connected in series between the 6 contact of the position switch 60 and the motor 102, and a diode 110 and the program switch P2 are connected in series between the 1 contact of the position switch 60 and the motor 102. A lead 112 extends from the cam switch 100 to the positive side of the advance coil 72 of the digital setting switch 52.

Referring to FIG. 4, a sample of an exemplary source document 28 is illustrated and comprises a scale ticket that would be utilized in the grain elevator business. The ticket is preprinted with the various information shown in FIG. 4, including the name of the customer and various code indicia. Additionally, it should be noted that five lines for coded data are defined within the rectangular outline 114, such lines being identified by the numerals 1 through 5 adjacent the left ends thereof. These lines are blank and must be encoded by the adding machine 20 in normal business operations.

Figure 5:
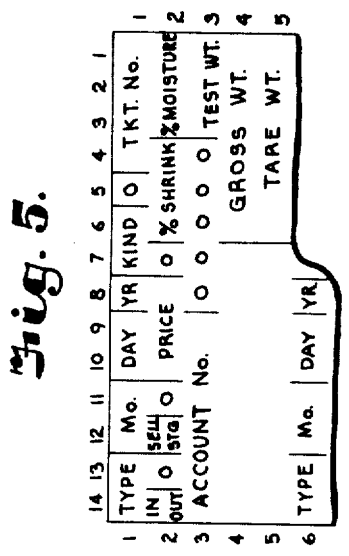
FIG. 5 shows the instructions comprising the instructional program for completing the scale ticket, and also illustrates the beginning of the next program.

The surface of the drum 44 is provided with a series of sets of instructions in the form of spaced lines of instructional information as depicted in FIg. 5. The drum 44 illustrated herein has a ten-line capacity which, in the illustrated embodiment, comprises two five-line programs. The first program (lines 1 through 5) is shown in full in FIG. 5 and comprises line by line instructions for the encoding of the corresponding lines on the scale ticket 28. The beginning of the sixth line is also illustrated and is the first line of the second program (lines 6 through 0) which could, for example, be an instructional program for encoding a purchase check or warehouse receipt. The line numbers appearing in vertical columns in FIG. 5 at the side margins of the instructional material and the row of numbers 1 through 14 (from right to left) corresponding to the rows of the adding machine keyboard 22 are included in FIG. 5 merely for clarity to permit the instructional lines in FIG. 5 to be easily correlated with the blank spaces 1 through 14 in the lines to be encoded on the scale ticket 28 illustrated in FIG. 4. If desired, the keyboard row numbers 1 through 14 may be placed on the panel 40 of the display unit 38 just above the window 42 in the operator's view to identify the keyboard rows corresponding to the instructional material in each line of instructions of the program.

OPERATION

It will be assumed that the operator has a number of scale tickets to encode, thus it is desired that instructional program number 1 be repeatedly displayed by the unit 38 since such program comprises lines 1 through 5 (FIG. 5) containing instructions for the proper preparation of a scale ticket document. The push button switch 50 may be operated to initially set the display at line 1, as indicated by the numeral 1 visible through the window 48. Each time the switch 50 is closed, it may be appreciated that the advance coil 72 is energized to step the switch element 70 one contact position. The switch 46 is closed for automatic advance operation, and the P1 switch is closed to select the first program for repeated presentation as will be subsequently discussed.

Only one line of the program at a time is visible through the elongated window 42. The first line of instructions tells the operator that the type of document being encoded (scale ticket) is to be entered by rows 14 and 13 of the adding machine keyboard 22. The type code is readily obtained from the printed ticket 28 (FIG. 4) where it may be seen that the scale ticket is type code "01." This data, of course, is recorded on the punch tape 36 as well as printed on the ticket 28, and will be the first bit of information read by the computer when the data is subsequently processed, thus the computer in reading the remainder of the data on the first five lines is aware that such data is scale ticket information. As can be seen in FIG. 5, the other data in line 1 relates to the month, day and year of the transaction, the kind of grain, and the ticket number. A two digit kind code is printed on the scale ticket, as is the ticket number. Other information that would have been entered by hand on the ticket above the rectangular outline 114 consists of the test weight, moisture percentage, and dockage.

After the operator depresses the proper keys 24 to completely encode the first line, the motor bar switch 26 is momentarily closed by the usual operation of the motor bar to simultaneously imprint the first line of the scale ticket 28 and record the numeric information in code on the paper tape 36. Closure of the motor bar switch 26 momentarily energizes the advance coil 72 to, in turn, advance the switch element 70 to the 2 contact. Unlike digital information is, there-fore, now present at the two sets of binary input terminals 54*a*–54 and 58*a*–58*d* of the comparator 56. This causes a voltage to be delivered at the output 62 of the comparator 56, causing energization of the solenoid 90 to, in turn, reciprocate the pawl 94 and index the drum 44. The interrupter contacts 92 momentarily open as the armature of the solenoid 90 is withdrawn, thereby pulsing the solenoid 90 even though voltage remains on the lead 88. Manifestly, the armature will continue to reciprocate as long as voltage is present on the lead 88, which will be the case until the drum 44 reaches the same digital position set by the position of the switch element 70 of the digital setting switch 52. In the present example the drum 44 indexes once and the switch element 82 is advanced into engagement with its associated 2 contact, thus the voltage is removed from the output 62 of the comparator 56 since 2 in binary coded form is present at both comparator inputs. The scale ticket 28 is automatically advanced to the second line in the usual fashion by the rotary platen of the adding machine 20. Accordingly, the operator is now ready to complete line 2 of the scale ticket in accordance with the new set of instructions. Note that a numeric code for inbound and outbound grain is printed on the scale ticket as well as a code indicating that the grain is to be sold or stored. The 0's in certain of the keyboard rows of instructional lines indicate spaces that do not contain data.

The foregoing makes reference to the "plus" motor bar and associated switch 26 for purposes of a general operational description, it being appreciated that adding machines such as the machine 20 are commonly provided with additional motor bars for subtract, total, and non-add functions. Accordingly, it should be understood that the switch 26 in FIG. 3 is representative of any selected motor bar switches of a particular machine, which would be parallel-connected in the power circuit to the advance coil 72 so that the latter is rendered responsive to the operation of each of such motor bars of the machine. It would normally be desired, for example, to encode lines 1 and 2 of the scale ticket by operation of a non-add motor bar.

Automatic incremental advancement of the drum 44 from line to line to sequentially position the lines of instructions continues until the completion of the fifth line. At that time operation of the motor bar advances the switch element 70 of the digital setting switch 52 to the 6 contact, causing the drum 44 to index once and advance the switch element 82 of the position switch 60 into engagement with its 6 contact. However, since switch P1 is closed, this energizes the motor 102 which operates for one revolution of its shaft by virtue of the immediate closure of the carrier switch 104. Accordingly, the cam switch 100 is momentarily closed five times to deliver five voltage pulses to the advance coil 72 of the digital setting switch 52. Manifestly, this action causes the switch element 70 to return to the position illustrated in engagement with its 1 contact. The drum 44 is forced to follow by the operation of the comparator, thus the display immediately returns to line 1 of the first program. It may be appreciated that a similar result is obtained when the program switch P2 is closed, except that the drum 44 now automatically incrementally advances from line 6 through line 0 and then automatically returns to line 6, the first line of the second program.

It should be understood that the drum 44 illustrated herein is only intended to be exemplary of one type of optical instruction medium suitable for use in the practice of the present invention. Particularly in systems involving a number of programs, it may be desired to employ a film strip controlled by supply and take-up reels. Furthermore, the mechanical pulser illustrated herein for automatically returning the display to the beginning of a selected program constitutes only one of a number of possible pulsing arrangements that could be employed for this function, it being apparent that the particular arrangement would be dictated by the number of serial pulses required and the different numbers of pulses necessitated by the programs employed in an apparatus of greater line capacity than the ten line capacity of the embodiment disclosed herein. Additionally, although the source material specifically illustrated comprises paper documents and punched tape, it is equally apparent that the teachings of the present invention are broadly applicable to other types of source material accommodated by a particular data system that must be properly encoded before computer processing.

Having thus described the invention, what is claimed as new and desired to be secured by Letters Patent is:

1. In combination:

a data system machine provided with a keyboard having a plurality of rows of character keys;

a source document in said machine having initially blank lines thereon, each of which comprises a plurality of blank spaces corresponding to said plurality of rows of keys, said machine being operable to imprint the spaces of each line of said document with data corresponding to the characters of selected keys of said keyboard, and said machine effecting the imprinting of said document one line at a time with each operation of said keyboard, whereby to sequentially encode the lines of said document;

an optical instruction medium having a series of spaced lines of instructional information thereon, each of which simulates the plurality of blank spaces of a corresponding line of said document and contains instructions in those simulated spaces representing the spaces on the corresponding line of the document to be encoded with data in accordance with said instructions;

a display unit adapted to be disposed in view of the operator to permit viewing of each of said lines of instructional information;

means operably associated with said medium for incrementally advancing the same to sequentially position said lines of instructional information for viewing of each line thereof at said unit by the operator; and control means coupled with said incremental advancing means for operating the latter to automatically effect advancement of the displayed instructional information from one line to the next succeeding line thereof in response to completion of encoding of each line of the document.

2. In the combination as claimed in claim 1, said series of lines of instructional information including a plurality of subseries thereof constituting a plurality of separate instructional programs, said control means including selectively operable means permitting any one of said programs to be selected, and means operably coupled with said selectively operable means for causing the incremental advancing means to repeatedly sequentially position for viewing only the lines of instructional information of a selected program.

3. In the combination as claimed in claim 1, said series of lines of instructional information including a plurality of subseries thereof constituting a plurality of separate instructional programs, said control means including selectively operable means permitting any one of said programs to be selected, and means operably coupled with said selectively operable means for causing the incremental advancing means to automatically return to the first line of instructional information of a selected program after completion of encoding of the line of the document corresponding to the last line of instructional information of the selected program.

4. In the combination as claimed in claim 1, said control means including position setting means responsive to completion of each line of the document for delivering a first signal indicating that said medium should be advanced and identifying the next line of instructional information that should be displayed, position monitoring means responsive to movement of said medium for delivering a second signal identifying the line of instructional information being displayed, and a comparator responsive to said signals for effecting operation of the incremental advancing means until the line of instructional information identified by the second signal is the same as the line of instructional information identified by the first signal.

5. In the combination as claimed in claim 4, said position setting means and said position monitoring means providing their respective signals in digital form, said comparator having a first digital input for receiving said first signal, a second digital input for receiving said second signal, and means for delivering an output signal in response to the presence of unlike digital information at said inputs.

6. In the combination as claimed in claim 1, there being code indicia on said document designating the keys of the keyboard to be used in encoding the document in accordance with the instructional information displayed by said unit.

* * * * *